US011535393B2

(12) United States Patent
Conaway et al.

(10) Patent No.: US 11,535,393 B2
(45) Date of Patent: Dec. 27, 2022

(54) METHODS AND SYSTEMS FOR AUTOMATIC CROSS-CHECKING OF ELECTRONIC CHECKLISTS

(71) Applicant: HONEYWELL INTERNATIONAL INC., Morris Plains, NJ (US)

(72) Inventors: Cody Ryan Conaway, Phoenix, AZ (US); Steven Curtis Crouch, Mesa, AZ (US); Barbara Holder, Seattle, WA (US)

(73) Assignee: Honeywell International Inc., Charlotte, NC (US)

( * ) Notice: Subject to any disclaimer, the term of this patent is extended or adjusted under 35 U.S.C. 154(b) by 92 days.

(21) Appl. No.: 16/822,989

(22) Filed: Mar. 18, 2020

(65) Prior Publication Data

US 2020/0298994 A1 Sep. 24, 2020

Related U.S. Application Data

(60) Provisional application No. 62/822,098, filed on Mar. 22, 2019.

(51) Int. Cl.
| | |
|---|---|
| *G06F 3/048* | (2013.01) |
| *B64D 43/00* | (2006.01) |
| *G06F 16/9038* | (2019.01) |
| *G06F 16/9035* | (2019.01) |
| *B64D 45/00* | (2006.01) |
| *G06F 3/0482* | (2013.01) |

(52) U.S. Cl.
CPC ............ *B64D 43/00* (2013.01); *B64D 45/00* (2013.01); *G06F 3/0482* (2013.01); *G06F 16/9035* (2019.01); *G06F 16/9038* (2019.01)

(58) Field of Classification Search
CPC ..... B64D 43/00; B64D 45/00; G06F 16/9038; G06F 16/9035; G06F 3/0482; G06F 3/0481; G06Q 10/06316
See application file for complete search history.

(56) References Cited

U.S. PATENT DOCUMENTS

| | | | |
|---|---|---|---|
| 2011/0145297 A1* | 6/2011 | Singh | G06F 40/18 707/802 |
| 2013/0139056 A1 | 5/2013 | Borkowski et al. | |

(Continued)

OTHER PUBLICATIONS

Extended European Search Report dated Aug. 27, 2020 in counterpart European Patent Application No. 20164716.1 (8 pages, in English).

*Primary Examiner* — Aleksey Olshannikov
(74) *Attorney, Agent, or Firm* — Bookoff McAndrews PLLC

(57) ABSTRACT

Disclosed are methods, systems, and non-transitory computer-readable medium for automatic cross-checking of an electronic checklist. One method may include: receiving a first user and/or system input associated with a graphical user interface (GUI) of the electronic checklist; determining whether the first user and/or system input triggers an error; in response to determining that the first user and/or system input triggers the error, displaying an error message on the GUI; receiving a second user and/or system input; determining whether the second user and/or system input resolves the error; and in response to determining the second user and/or system input resolves the error, removing the error message from the GUI.

20 Claims, 9 Drawing Sheets

(56) References Cited

U.S. PATENT DOCUMENTS

2016/0216849 A1* 7/2016 Kawalkar ............ G06F 3/04895
2017/0291723 A1* 10/2017 Reddy .................... B64D 45/00
2019/0279158 A1* 9/2019 Kestone ................. G16H 10/60

* cited by examiner

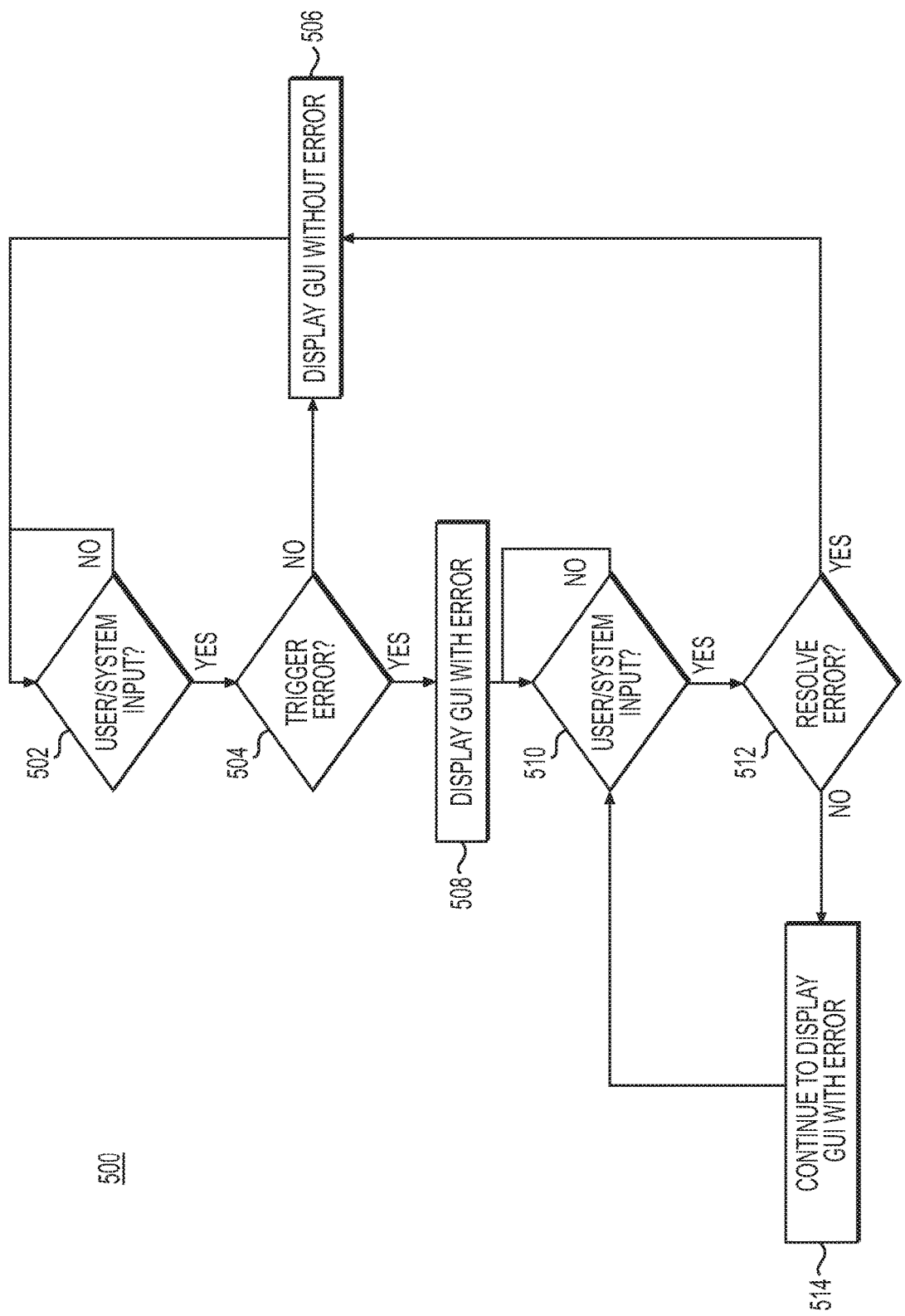

METHODS AND SYSTEMS FOR AUTOMATIC CROSS-CHECKING OF ELECTRONIC CHECKLISTS

CROSS-REFERENCE TO RELATED APPLICATION(S)

This application claims the benefit of priority to U.S. Provisional Application No. 62/822,098, filed Mar. 22, 2019, which is incorporated herein by reference in its entirety.

TECHNICAL FIELD

Various embodiments of the present disclosure relate generally to methods and systems for automatic cross-checking of electronic checklists and, more particularly, to methods and systems for automatic cross-checking of avionics electronic checklists.

BACKGROUND

Generally, aircraft checklists contain tasks which require users of an aircraft (e.g., flight crew, pilots, maintenance engineers, etc.) to verify the correct performance of actions between an instruction of the aircraft checklist and a component or control of the aircraft (e.g., of a cockpit of the aircraft). However, the users may sometimes commit errors due to the unintentional omission of tasks or perform tasks out of order. For instance, a checklist task may instruct the user to turn the "RH ISOL and LH ISOL buttons OFF," but the user may unintentional only turn off one of the RH ISOL and LH ISOL buttons.

User errors may increase user cognitive workload through increased cognitive demands, increase user time on tasks to complete checklists, and/or cause accidents. Therefore, there is a challenge to inform users when action(s) have been omitted or performed out of order, so as to reduce cognitive workload, reduce user time associated with completion of checklists, and/or avoid accidents.

The present disclosure is directed to overcoming one or more of these above-referenced challenges.

SUMMARY OF THE DISCLOSURE

According to certain aspects of the disclosure, systems and methods are disclosed for automatic cross-checking of avionics electronic checklists.

For instance, a method may include: receiving a first user and/or system input associated with a graphical user interface (GUI) of the electronic checklist; determining whether the first user and/or system input triggers an error; in response to determining that the first user and/or system input triggers the error, displaying an error message on the GUI; receiving a second user and/or system input; determining whether the second user and/or system input resolves the error; and in response to determining the second user and/or system input resolves the error, removing the error message from the GUI.

Moreover, a system may include: a memory storing instructions; and a processor executing the instructions to perform a process. The process may include: receiving a first user and/or system input associated with a graphical user interface (GUI) of the electronic checklist; determining whether the first user and/or system input triggers an error; in response to determining that the first user and/or system input triggers the error, displaying an error message on the GUI; receiving a second user and/or system input; determining whether the second user and/or system input resolves the error; and in response to determining the second user and/or system input resolves the error, removing the error message from the GUI.

Furthermore, a non-transitory computer-readable medium may store instructions that, when executed by a processor, cause the processor to perform a method. The method may include: receiving a first user and/or system input associated with a graphical user interface (GUI) of the electronic checklist; determining whether the first user and/or system input triggers an error; in response to determining that the first user and/or system input triggers the error, displaying an error message on the GUI; receiving a second user and/or system input; determining whether the second user and/or system input resolves the error; and in response to determining the second user and/or system input resolves the error, removing the error message from the GUI.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts a flowchart for a method for automatic cross-checking of avionics electronic checklists, according to one or more embodiments.

DETAILED DESCRIPTION OF EMBODIMENTS

Figure 1:
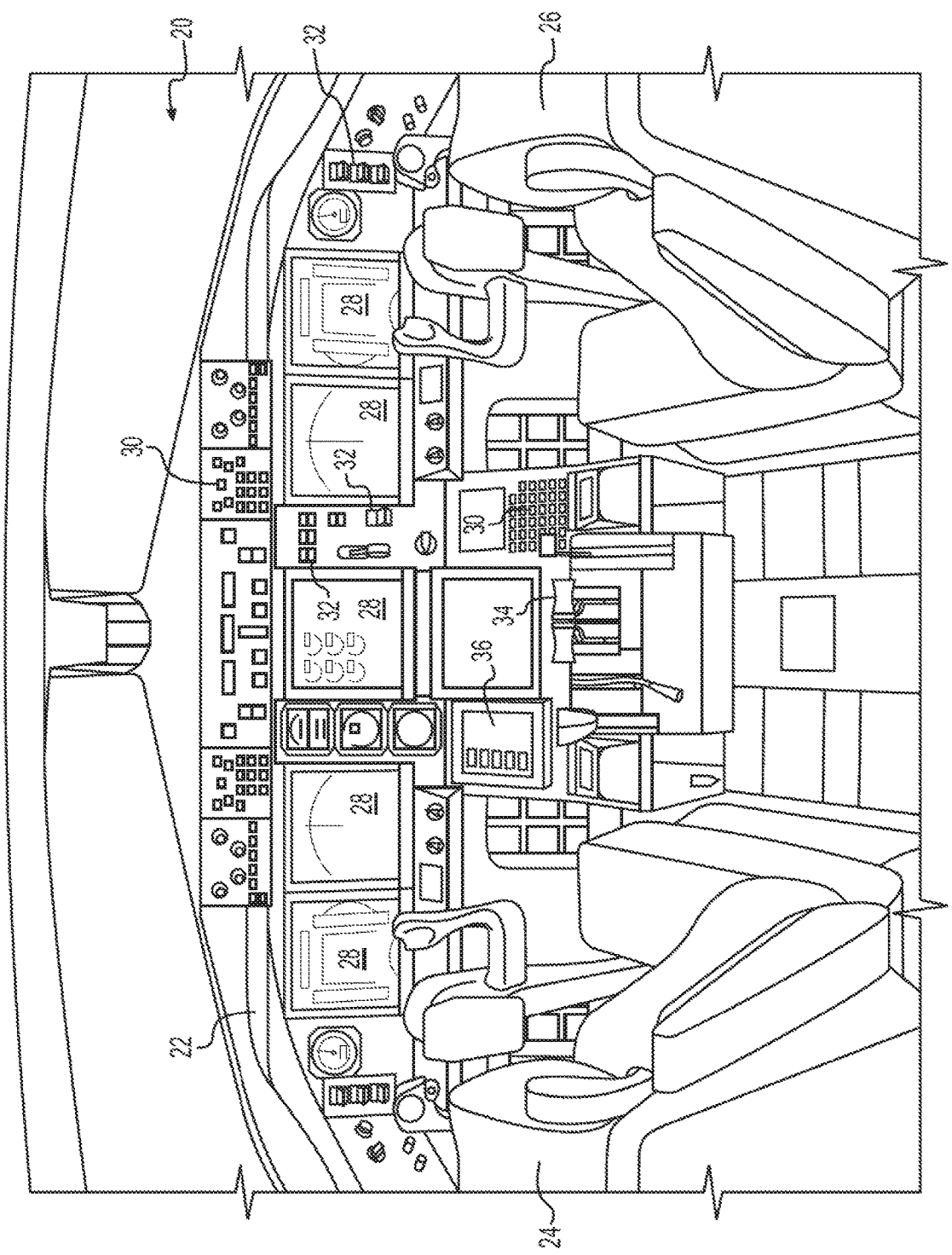
FIG. 1 depicts an exemplary vehicle system environment for displaying electronic vehicle checklists, according to one or more embodiments.

Various embodiments of the present disclosure relate generally to systems and method for automatic cross-checking of electronic checklists.

In general, the present disclosure is directed to systems and method for automatic cross-checking of avionics electronic checklists. Specifically, as discussed in detail below, a system of the present disclosure may observe user(s) as the user(s) perform checklist tasks (e.g., receive user inputs and/or system inputs) and confirm (e.g., "cross-check") that the user(s) perform the checklist properly (e.g., in order or by including specific task(s)). Therefore, the systems and methods of the present disclosure may act as safety monitor for the user(s) by indicating potential errors when the user(s) do not perform the checklist task properly (e.g., out of order or without the specific task(s)). This may be similar to having another user observing the actions of the user(s) to ensure the user(s) are performing the checklist properly.

For instance, in one aspect of the disclosure, the system of the disclosure may: determine the user(s) have not completed action(s) as the system expects (hereinafter "checklist error(s)") based on inputs from sensors that are monitoring all aircraft systems; and display visual indication(s) and/or notification(s) on a graphical user interface (GUI) to inform the user(s) of the system of the checklist error(s). For instance, when a user commits a checklist error associated with an action, the system may emphasize a checklist task associated with the action to focus attention on the checklist error. Additionally or alternatively, the system may prevent the user(s) from proceeding forward in the current checklist. The system may also, simultaneously or in response to a user input, display an override button to the user(s). The user(s) may then correct the checklist error by following the checklist task(s) as the checklist task(s) are written and perform the action(s), or the user(s) may select the override button to indicate to the system to accept the completed step as "correct." For instance, the user(s) may select the override button when the user(s) may be certain the action(s) were performed correctly and that it appears as if the system may be incorrectly sensing the completed action (e.g., by erroneously comparing condition, have outdated sensor data and/or malformed sensor data, etc.).

Therefore, the systems and methods of the present disclosure may reduce cognitive workload (or increase human performance by using the cognitive workload for other tasks in the cockpit), reduce time to complete checklists, and/or avoid accidents. Moreover, this may result in more predictable user behaviors.

While this disclosure describes the systems and methods with reference to aircraft, it should be appreciated that the present systems and methods are applicable to electronic checklists of vehicles, including those of drones, automobiles, ships, or any other autonomous and/or Internet-connected vehicle. Moreover, the systems and methods of the present disclosure are applicable to electronic checklists in general.

As shown in FIG. 1, an exemplary system environment for an electronic checklist is depicted, according to one or more embodiments. Specifically, FIG. 1 is a fragmentary perspective view illustrating the inside of an exemplary aircraft cockpit 20. Although the context of the following discussion is with respect to GUIs of touch screen displays used in aircraft, it should be understood that the teachings herein pertain to touch screen displays used in any type of vehicle including, but not limited to, land based vehicles such as automobiles and trains as well as watercraft and spacecraft. Additionally, the teachings herein are not limited to vehicle applications. Rather, the teachings herein may also be used together with touch screen displays that are employed in stationary applications such as information kiosks and automatic teller machines as well as with touch screen displays that are hand held or otherwise not mounted to a surface.

Aircraft cockpit 20 includes an instrument panel 22 positioned to be accessible from a pilot seat 24 and a copilot seat 26. Instrument panel 22 includes various front displays 28 and various control features such as buttons 30, switches 32, and throttle controls 34. Also mounted on instrument panel 22 is a control touch screen display 36. Moreover, the front displays 28 may also be touch screen displays.

Figure 2:
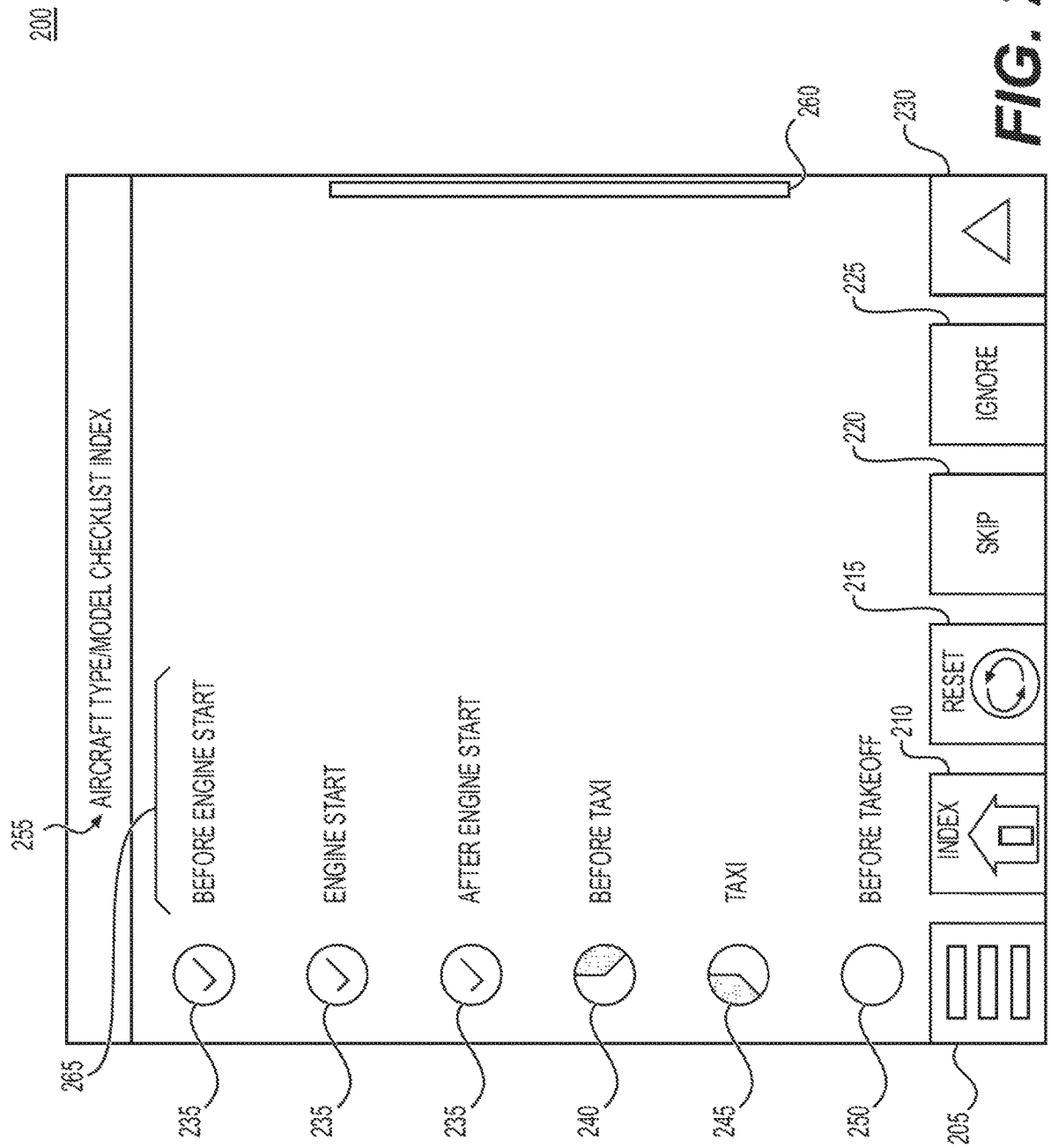
FIGS. 2 and 3 depict GUIs for exemplary electronic checklists, according to one or more embodiments.
Figure 3:
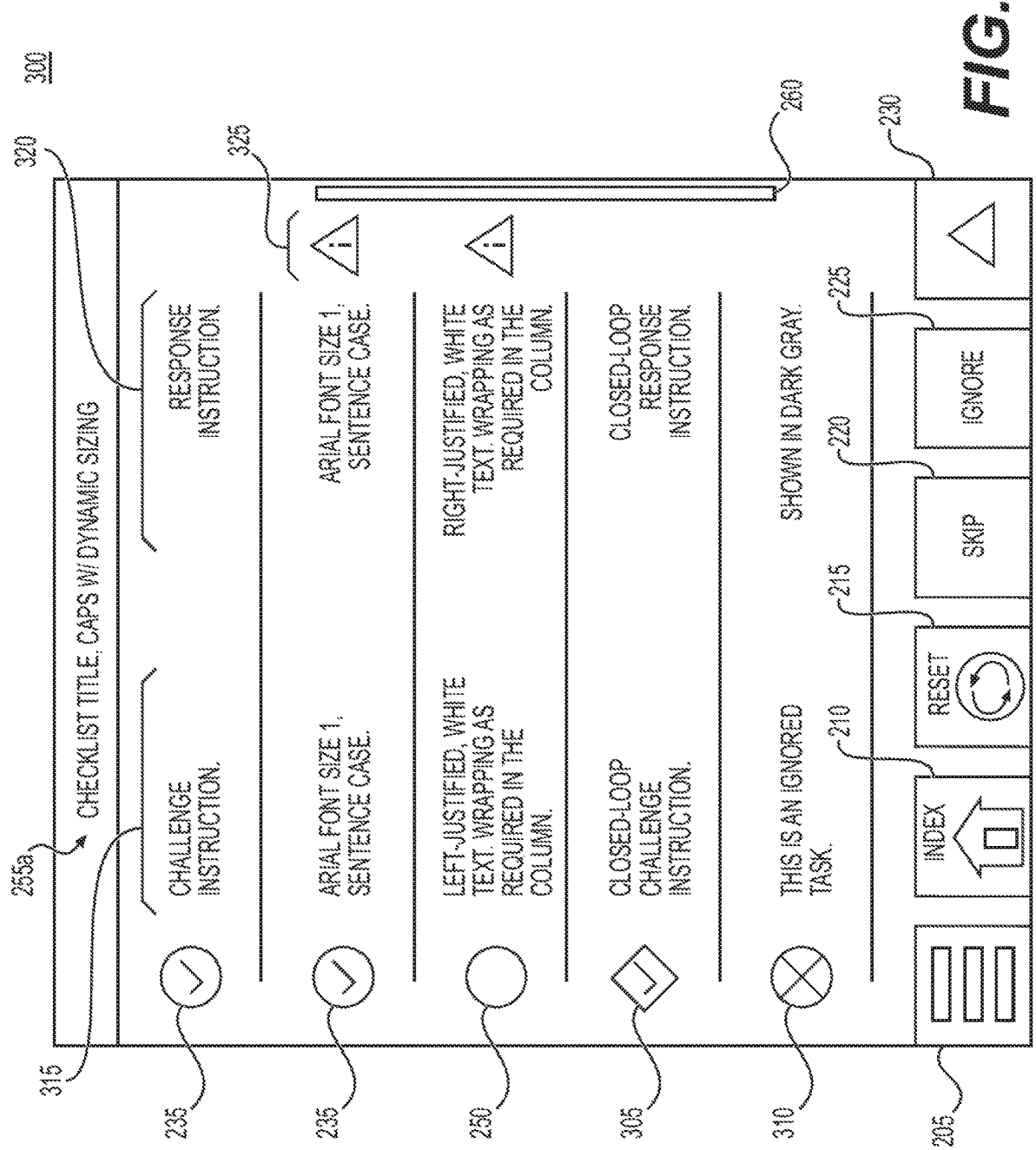

One of the front displays 28 or the control touch screen display 36 (called herein "vehicle manager touch screen") may be configured to operate as a vehicle manager that may display interactive electronic checklists and/or navigation or other vehicle system data. Specifically, a processor may execute a vehicle manager program (comprised of instructions executable by the processor) that causes the vehicle manager touch screen to display a vehicle manager display. For instance, the vehicle manager display may include one or more GUIs as disclosed herein (or variations thereof), such as GUI 200 and GUI 300 (as depicted in FIGS. 2 and 3, respectively).

The processor may cause the vehicle manager touch screen to display the vehicle manager display by generating images and transmitting the images to the vehicle manager touch screen to be displayed. Alternatively, the processor may generate instructions and information and transmit the instructions and information to a graphics processing unit (GPU). The GPU may generate the images to be displayed on the vehicle manager touch screen. The vehicle manager program may be stored in a memory. The memory may be connected to the processor so that the processor may receive stored instructions or data, and the processor may process the instructions, stored data, and received information, in accordance with the vehicle manager program. The memory and the processor may be connected to the vehicle manager touch screen either directly or indirectly. Collectively the memory, the processor, and the vehicle manager touch screen may be referred to as a "vehicle manager system." In one embodiment, the vehicle manager system may be an electronic procedure system of a vehicle.

For instance, the vehicle manager program may control a functionality and configuration of the vehicle manager touch screen, in accordance with a loadable checklist control file (called herein a "loadable database"), e.g., received from a cloud service. The vehicle manager program may store the loadable database in the memory. The vehicle manager program may control the configuration of the vehicle manager touch screen, based on user inputs to the system, data from other vehicle systems, and/or FMS data from, e.g., a cloud FMS. Specifically, the vehicle manager program may display the vehicle manager display to depict an electronic checklist in accordance with the loadable database, and receive user inputs to view and/or to change the configuration of the vehicle manager touch screen.

Generally, user inputs may be a touch interaction with the vehicle manager touch screen (e.g., capacitive, resistive, and/or optical sensing), a user input on a keyboard, a mouse, a scroll wheel, or any other system-defined manner of selecting and interacting with the system. The processor may receive the user inputs and perform specific actions based on the user inputs, in accordance with the vehicle manager program.

FIGS. 2 and 3 depict exemplary GUIs for an electronic checklist, according to one or more embodiments. Specifically, FIGS. 2 and 3 may depict a functionality and configuration of the vehicle manager touch screen, in accordance with a loadable database received from a cloud service.

In FIG. 2, GUI 200 may include a group of home icons (including one or more of a system function menu icon 205, an index icon 210, a reset icon 215, a skip icon 220, an ignore icon 225, a display control drop down menu icon 230), one or more completed task indicators 235, one or more partially completed task indicators 240 and 245, one or more incomplete task indicators 250, a header 255, a scroll bar indicator 260, and one or more task titles 265. A processor, as described above, may cause GUI 200 to be displayed on the vehicle manager touch screen of the system. The GUI 200 may be a home menu for a vehicle manager system. One or more tasks (a task may be an indicator associated with a task title) may represent a sub-checklist. A user may select the task, and the sub-check list corresponding to the selected task may be displayed; for instance, FIG. 3 may depict an example of a sub-check list that is displayed in GUI 300. In each checklist (parent checklist), any task may represent a sub-checklist of the parent checklist (e.g., a sub-check list to a sub-checklist is a grandchild to the home menu).

In FIG. 3, the GUI 300 may include the same features as the GUI 200, however it may also be different, and it may include a different header 255*a*, one or more system completed task indicators 305, one or more ignored task indicators 310, one or more challenge instructions 315, one or more response instructions 320, and one or more additional information indicators 325. Specifically, as mentioned above, when a user selects a task with a sub-checklist, the processor may update the display to display the sub-checklist. The different header 255*a* may correspond to the task title 265 associated with the selected task (or a sub-checklist name if different than the task title 265). The one or more challenge instructions 315 and the one or more response instructions 320 may each be associated with an indicator. The one or more challenge instructions 315 may contain text associated with the task the user is to focus attention on. The one or more response instructions 320 may contains text associated with the task the crew is to the focus on. The one or more additional information indicators 325 may be checklist impact notifications (CINs). The one or more additional information indicators 325 may be associated with tasks that have additional information related to notes, cautions, and warnings. CINs may provide access to notes, cautions, and warnings for individual tasks by a message popup.

Figure 4:
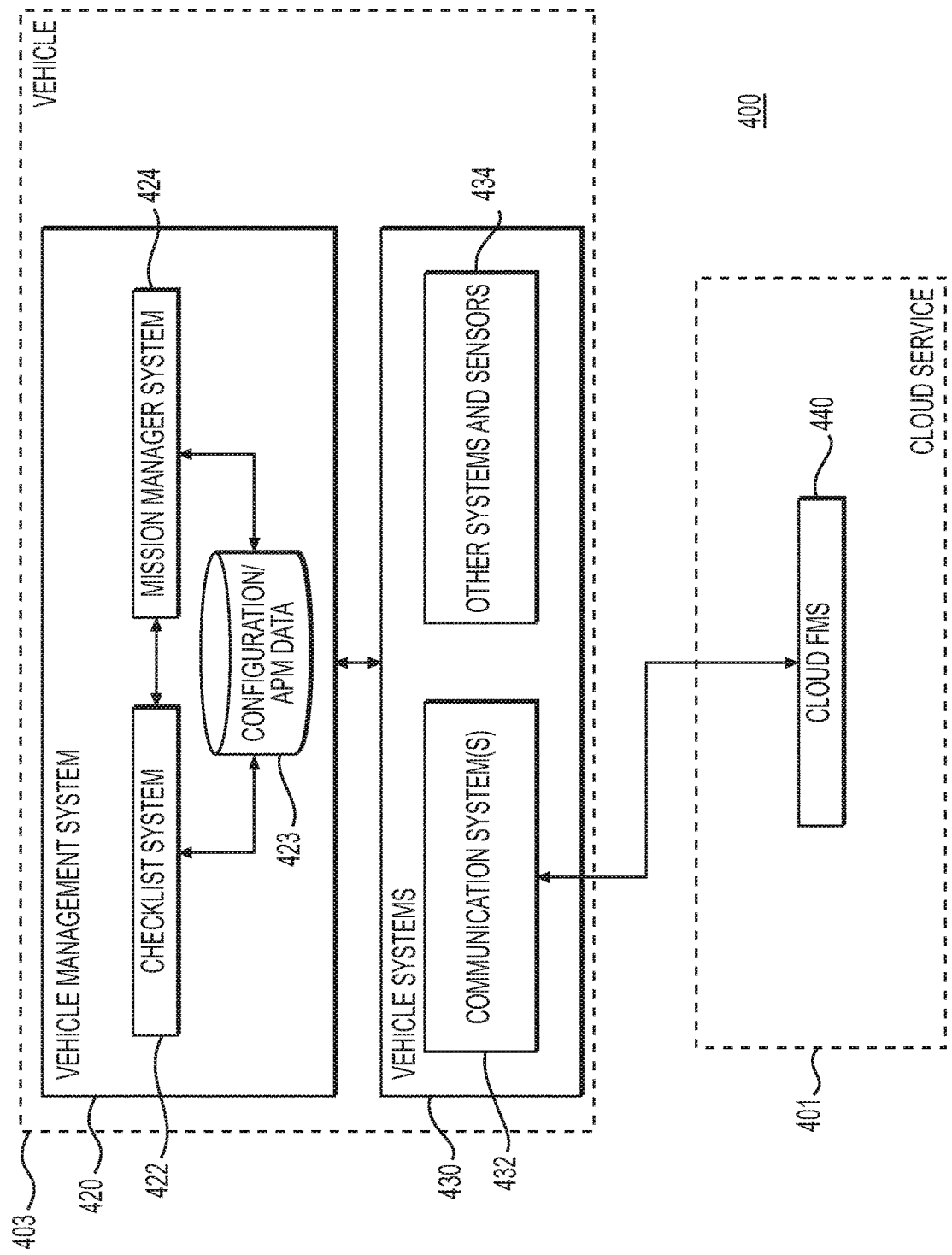
FIG. 4 depicts an exemplary block diagram of a system for automatic cross-checking of avionics electronic checklists, according to one or more embodiments.

FIG. 4 depicts an exemplary block diagram of a system 400 for automatic cross-checking of avionics electronic checklists, according to one or more embodiments. The system 400 may include a cloud service 401 and/or a vehicle 403. The cloud service 401 and the vehicle 403 may communicate over a network using, e.g., a TCP/IP communication infrastructure, or the cloud service 401 and the vehicle 403 may communicate over the network and/or satellite communications infrastructure, etc.

The cloud service 401 may include a cloud flight management system (FMS) 440 and/or other software as a service (SaaS) systems. The cloud FMS 440 may be a cloud-based platform that provides FMS services to any user who has authorized access to the cloud FMS 440. Specifically, the cloud FMS 440 may provide FMS micro-services. The FMS micro-services may be FMS services organized as a collection of specialized modular services. In some implementations, the FMS micro-services may be software applications stored, at least in part, in one or more servers remote from the vehicle 403, for cloud-based access from the vehicle 403. The FMS micro-services may be modular services which are developed, deployed, and scaled independently of each other, messaging-enabled to communicate with various components within the cloud FMS 440, and organized around capabilities. The FMS micro-services may include, for example, flight planning services, in-flight navigation services, airport specific services, ground communication services, weather services, services for computing fuel scenarios, services for computing optimization scenarios, services for offsetting deviations, and services for computing approach procedures. The FMS micro-services may be implemented as hardware, software, and/or a combination of hardware and software.

The vehicle 403 may include a vehicle management system 420 and vehicle systems 430. In one embodiment, the vehicle management system 420 may be an electronic procedure system of a vehicle. The vehicle management system 420 may include a checklist system 422, a mission manager system 424, and/or a configuration memory 423 storing configuration data and/or aircraft profile management (APM) data. The configuration data may include configuration rules that general apply to checklists and/or display of information. The APM data may include additional configuration rules specific to different aircraft defined by original equipment manufacturers (OEM). The vehicle systems 430 may include one or more communications system(s) 432 and other systems and sensors 434.

The one or more communications system(s) 432 may include one or more of a cellular communications system, a Wi-Fi system, a radio communications system, a satellite communications system, etc. The one or more communications system(s) 432 may receive and transmit messages to/from the vehicle 403 from/to the cloud 401 (e.g., the cloud FMS 440). The one or more communications system(s) 432 may also communicate with the vehicle management system 420. For instance, the one or more communications system(s) 432 may receive FMS data from the cloud FMS 440, and transmit the FMS data to the vehicle management system 420.

The other systems and sensors 434 may include one or more of navigation systems (e.g., GPS systems), engine systems, actuation systems, control systems, temperature systems, life systems, external sensors (e.g., weather radar, temperature, pressure, density, velocity sensors) or internal sensors (e.g., cabin pressure sensor), etc. of the vehicle 403. The other systems and sensors 434 may communicate with the vehicle management system 420. For instance, the other systems and sensors 434 may transmit vehicle systems data to the vehicle management system 420.

The checklist system 422 may communicate with the configuration memory 423, the mission manager system 424, and/or the other systems and sensors 434. The checklist system 422 may receive a loadable database from a checklist designer system. The checklist system 422 may also receive messages from the mission manager system 424; the configuration/APM data from the configuration memory 423; and the vehicle systems data of the other systems and sensors 434. The checklist system 422 may output checklists GUIs and/or information for checklist GUIs to the mission manager system 424, for displaying checklist GUIs by the mission manager system 424, in accordance with the loadable database, the messages, the configuration/APM data, and the vehicle systems data.

For instance, the checklist system 422 may extract one or more data structure(s) and one or more function(s) from the loadable database; extract rulebook rules from a rulebook (e.g., included in the loadable database); extract data from databases of the vehicle 403; extract configuration rules from the configuration/APM data; extract sensor data and/or synoptic data from vehicle systems data; extract notifications from the messages from the mission manager system 424 (e.g., a selection based on user inputs or a CAS message); and extract phase of flight information from messages from the mission manager system 424 (collectively, "checklist inputs"). The checklist system 422 may validate the checklist inputs, e.g., to ensure correct source(s), correct format, etc.

As discussed above, the loadable database may include the one or more function(s) and the one or more data structure(s) for generation and control of the checklist GUIs.

Specifically, a data structure may include content and arrangement information. The content may be displayed in a checklist GUI in accordance with arrangement information. The configuration rules of the configuration/APM data may include display rules for how the content is to be displayed in accordance with the arrangement information. A function may include program code for how system and/or user inputs are to update the checklist GUI (e.g., as outputs).

For instance, the one or more data structure(s) may include information about minimum equipment lists (MELs), master MELs (MMELs), aircraft flight manuals (AFMs), configuration deviation lists (CDLs), etc. The program code of the one or more function(s) may control checklist GUIs and data based on events. Events may be based phase of flight, CAS messages, flight plan data, flight data, synoptics, and/or pilot action(s). For example, a function may start based on a phase of flight event (e.g., transition between takeoff and cruise), and the function may generate and display a first checklist GUI corresponding to one or more tasks for the transition from takeoff to cruise. As another example, a function may start based on an emergency event (e.g., information indicating a sensor detecting smoke, which may be included in the vehicle systems data), and generate and display a second checklist GUI corresponding to one or more tasks for resolving the emergency event. As discussed above, the checklist GUIs may be based on the one or more data structure(s), the configuration/APM data, and/or the one or more function(s).

The mission manager system 424 may communicate with the checklist system 422, the configuration memory 423, the other systems and sensors 434, and the cloud FMS 440 (via, e.g., the one or more communications systems 432). The mission manager system 424 may receive messages from the checklist system 422 (e.g., information/instructions/graphics for displaying the checklist GUI); the configuration/APM data from the configuration memory 423; the vehicle systems data of the other systems and sensors 434; and/or the FMS data from the cloud FMS 440.

The mission manager system 424 may manage MEL data, manage flight plan buffer and/or display, and/or manage checklist display and interactions from a user, such as a crew of an aircraft. Specifically, the mission manager system 424 may display one or more of the checklist GUIs, and receive and process user inputs. For instance, the mission manager system 424 may render GUIs for managing phase of flight based checklists, GUIs for managing CAS/emergency checklists, and/or GUIs for aircraft configurations, and manage crew selections with respect to the rendered GUIs. For instance, the mission manager may render the GUIs, as based on the messages from the checklist system 422; the configuration/APM data from the configuration memory 423; the vehicle systems data of the other systems and sensors 434; and/or the FMS data from the cloud FMS 440.

In one aspect of the disclosure the checklist system 422 may perform a cross-check process. The cross-check process may include steps to: obtain checklist inputs; determine whether a currently active checklist (e.g., a checklist that is currently being displayed) is being performed properly based on the checklist inputs; in response to determining that the currently active checklist is not being performed properly (e.g. determine a checklist error), display an error message on a graphical user interface (GUI) associated with the currently active checklist to inform the user(s) of the checklist system 422 of the checklist error; obtain additional checklist inputs; and resolve the checklist error based the additional checklist inputs.

To obtain the checklist inputs, the checklist system 422 may obtain the sensor data and/or synoptic data from vehicle systems data as system inputs and the notifications from the mission manager system 424 as user inputs. To determine whether the currently active checklist is being performed properly, the checklist system 422 may determine whether the currently active checklist is being performed properly based on the system inputs and the user inputs and the one or more data structure(s) and/or one or more function(s) from the loadable database.

For instance, the one or more data structure(s) and/or one or more function(s) from the loadable database may include, for one or more (or for each) checklist, proper execution information. The proper execution information for a checklist may include information indicating a sequence of completion and/or required tasks for completion of the checklist. The sequence of completion may correspond to a displayed order of tasks for the checklist. The required tasks for completion may indicate none, one, or more tasks of a plurality of tasks included in the checklist that must be performed to complete the checklist or the required tasks may indicate a next task to be completed based on a most recently completed task or combination of tasks. The sequence of completion and/or the required tasks for completion of the checklist may be defined by an author of the loadable database.

The checklist system 422 may compare the system inputs and the user inputs (e.g., most recent system inputs and user inputs and/or previous system inputs and user inputs) to the proper execution information to determine whether the currently active checklist is being performed properly. For instance, the checklist system 422 may determine which task(s) have been completed based on the system inputs and the user inputs, indicating one or more tasks have been completed; and compare the one or more tasks that have been completed to the sequence of completion and/or the required tasks for completion of the checklist to determine whether the sequence of completion or the required tasks for completion are being followed based on the comparison.

To determine whether the sequence of completion or the required tasks for completion are being followed, the checklist system 422 may determine a sequence for the one or more tasks that have been completed based on the one or more tasks that have been completed and associated times of the user inputs or the system inputs for the one or more tasks; and determine whether the sequence of completed tasks is different from the sequence of completion and/or the required tasks for completion of the checklist with respect to a starting task of the sequence of completion and/or a most recent task of the required tasks. If the sequence of completed tasks is different from the sequence of completion and/or the required tasks, then the checklist system 422 may determine that the sequence of completion or the required tasks for completion are not being followed (a checklist error) (collectively, "trigger errors"). If the sequence of completed tasks is not different from the sequence of completion and/or the required tasks, then the checklist system 422 may determine that the sequence of completion or the required tasks for completion are being followed, and update the GUI associated with the currently active checklist in accordance with the user input and/or the system input, without an error message.

In response to determining that the sequence of completion or the required tasks for completion are not being followed (a checklist error), the checklist system 422 may display an error message on the GUI associated with the currently active checklist to inform the user(s) of the checklist system 422 of the checklist error. The error message may include visual indication(s) and/or notification(s) near tasks associated with the checklist error on the GUI. For instance, the visual indication(s) may include a change in status indicator for the tasks, such as discussed below with respect to FIGS. 6A-6C, and/or a symbol may be displayed next to the status indicator, such as a flag or warning symbol. The notification(s) may include text and/or buttons that the user may select.

Additionally or alternatively, the error message may emphasize the task associated with the action to focus attention on the checklist error. For instance, to emphasize the task, the checklist system 422 may perform one or a combination of change of color, bold, highlight, italicize, etc., on text or symbols associated with the task and/or dim a background of not completed tasks and/or non-required tasks. Additionally or alternatively, when the error message is displayed, the checklist system 422 may prevent the user(s) from proceeding forward in the current checklist. For instance, the checklist system 422 may ignore user inputs on the not completed tasks and/or the non-required tasks. Additionally or alternatively, the error message may, simultaneously or in response to a user input, display an override button to the user(s), such as discussed below with respect to FIGS. 6A-6C.

The user(s) may then correct the checklist error by following the checklist task(s) as the checklist task(s) are written and perform the action(s), or the user(s) may select the override button to indicate to the checklist system 422 to accept the completed step as "correct" (collectively, "resolve errors"). The checklist system 422 may receive a user input selecting the override button or a user input to perform the actions (from the mission manager system 424), or a system input indicating the action was performed from the other systems and sensors 434.

The checklist system 422 may, in response receiving the user input to perform the actions or the system input indicating the action was performed, update the GUI to proceed with the checklist. For instance, the checklist system 422 may deemphasize the task associated with the action. For instance, to deemphasize the task, the checklist system 422 may undo the change of color, undo the bold, undo the highlight, undo the italicize, etc. on the text or symbols associated with the task and/or undo the dim on the background of not completed tasks and/or non-required tasks. Additionally or alternatively, the checklist system 422 may undo the prevention of the user(s) from proceeding forward in the current checklist. For instance, the checklist system 422 may now process user inputs on the not completed tasks and/or the non-required tasks. The checklist system 422 may also remove the override button from the GUI.

In another aspect of the disclosure, the checklist system 422 may obtain a next action from the sequence of completion and/or the required action, and compare user inputs and/or system inputs to the next action. If the user inputs and/or the system inputs are not the same as the next action, the checklist system 422 may determine a checklist error and proceed as discussed above. If the user inputs and/or the system inputs are the same as the next action, the checklist system 422 may determine no checklist error and proceed as discussed above.

Therefore, the systems and methods of the present disclosure may reduce cognitive workload (or increase human performance by using the cognitive workload for other tasks in the cockpit), reduce time to complete checklists, and/or avoid accidents, by informing the users of checklist errors and directing the users' attention to how to quickly resolve the checklist errors. Moreover, this may result in more predictable user behaviors, as checklist system 422 may prevent the users from proceeding forward with the checklist until the checklist errors are resolved.

FIG. 5 depicts a flowchart 500 for a method for automatic cross-checking of avionics electronic checklists, according to one or more embodiments. The method of the flowchart 500 may be performed by the checklist system 422, in accordance with a loadable database, as discussed above. The method of the flowchart 500 may correspond to the cross-check process, described above. In the flowchart 500, the method may start at block 502 by determining whether a user and/or system input is received. In response to determining that a user and/or system input has not been received (block 502: No), the method may proceed to return to block 502 to determine whether a user and/or system input is received. For instance, the checklist system 422 may obtain the checklist inputs, as discussed above with respect to FIG. 4.

In response to determining that a user and/or system input has been received (block 502: Yes), the method may proceed to block 504 to determine whether the user and/or system input triggers an error. For instance, the checklist system 422 may use the sequence of completion and/or the required tasks for completion, as discussed above with respect to FIG. 4.

In response to determining that the user and/or system input does not trigger an error (block 504: No), the method may proceed to block 506 to display a checklist GUI without an error message. For instance, the checklist system 422 may update a currently displayed checklist GUI with a change to one of the status indicators to completed, based on a system input or a user input indicating a corresponding task is complete. Then, the method may proceed to block 502 to determine whether a user and/or system input is received.

In response to determining that the user and/or system input does trigger an error (block 504: Yes), the method may proceed to block 508 to display a checklist GUI with an error message. For instance, the checklist system 422 may update the currently displayed checklist GUI with an error message, as discussed above with respect to FIG. 4. Then, the method may proceed to block 510 by to determine whether a user and/or system input is received. In response to determining that a user and/or system input has not been received (block 510: No), the method may proceed to return to block 510 to determine whether a user and/or system input is received.

In response to determining that a user and/or system input has been received (block 510: Yes), the method may proceed to block 512 to determine whether the user and/or system input resolves the error. For instance, the checklist system 422 may receive user inputs selecting the override button or performing the action or receive system inputs indicating the action was performed, as discussed above with respect to FIG. 4.

In response to determining that the user and/or system input does resolve the error (block 512: Yes), the method may proceed to block 506 to display the checklist GUI without the error message. Then, the method may proceed to block 502 to determine whether a user and/or system input is received.

In response to determining that the user and/or system input does not resolve the error (block 512: No), the method may proceed to block 514 to continue to display the checklist GUI with the error message. Then, the method may proceed to block 510 to determine whether a user and/or system input is received.

Figure 6A:
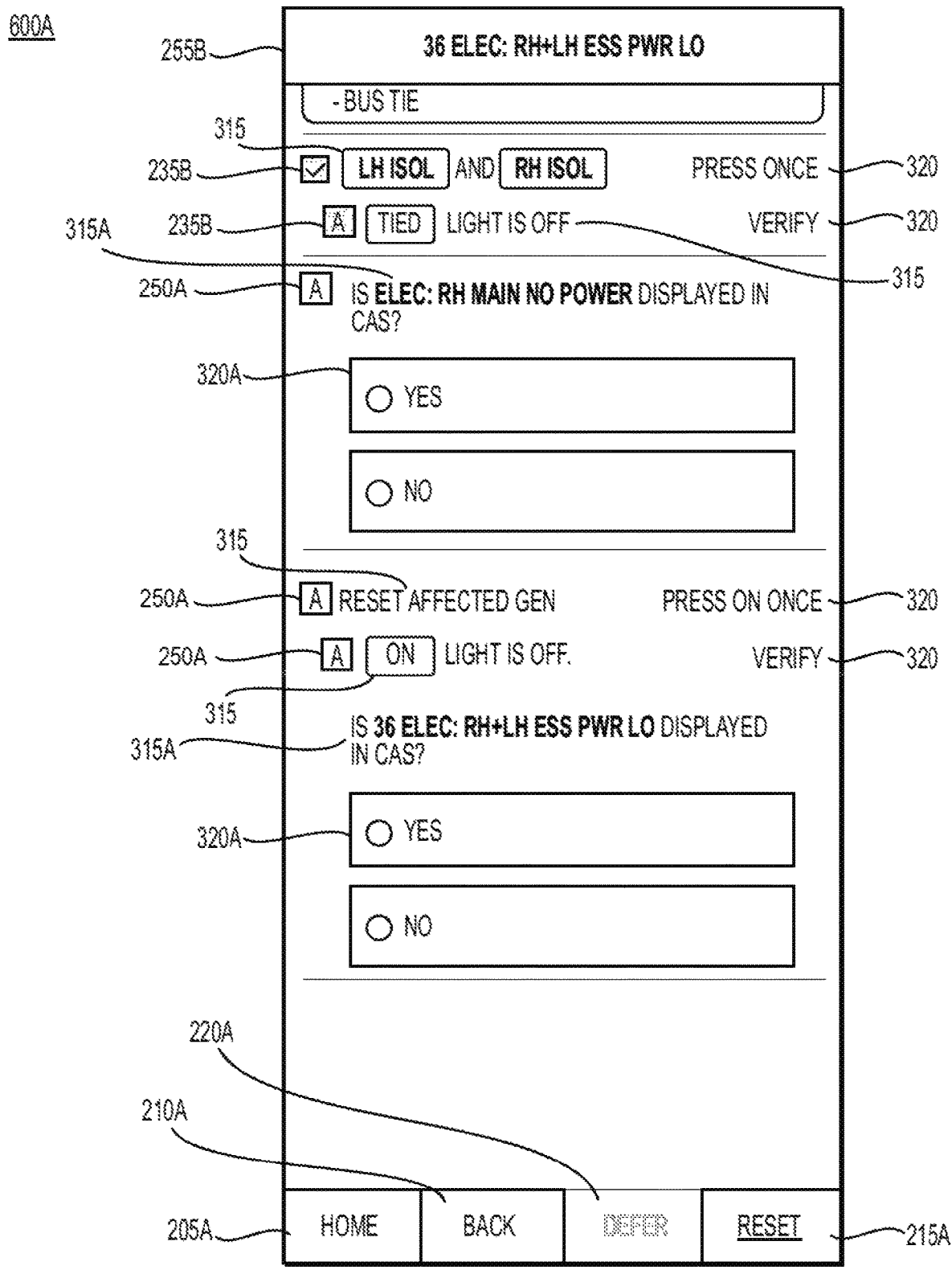
FIGS. 6A-6C depict exemplary GUIs for automatic cross-checking of avionics electronic checklists, according to one or more embodiments.
Figure 6B:
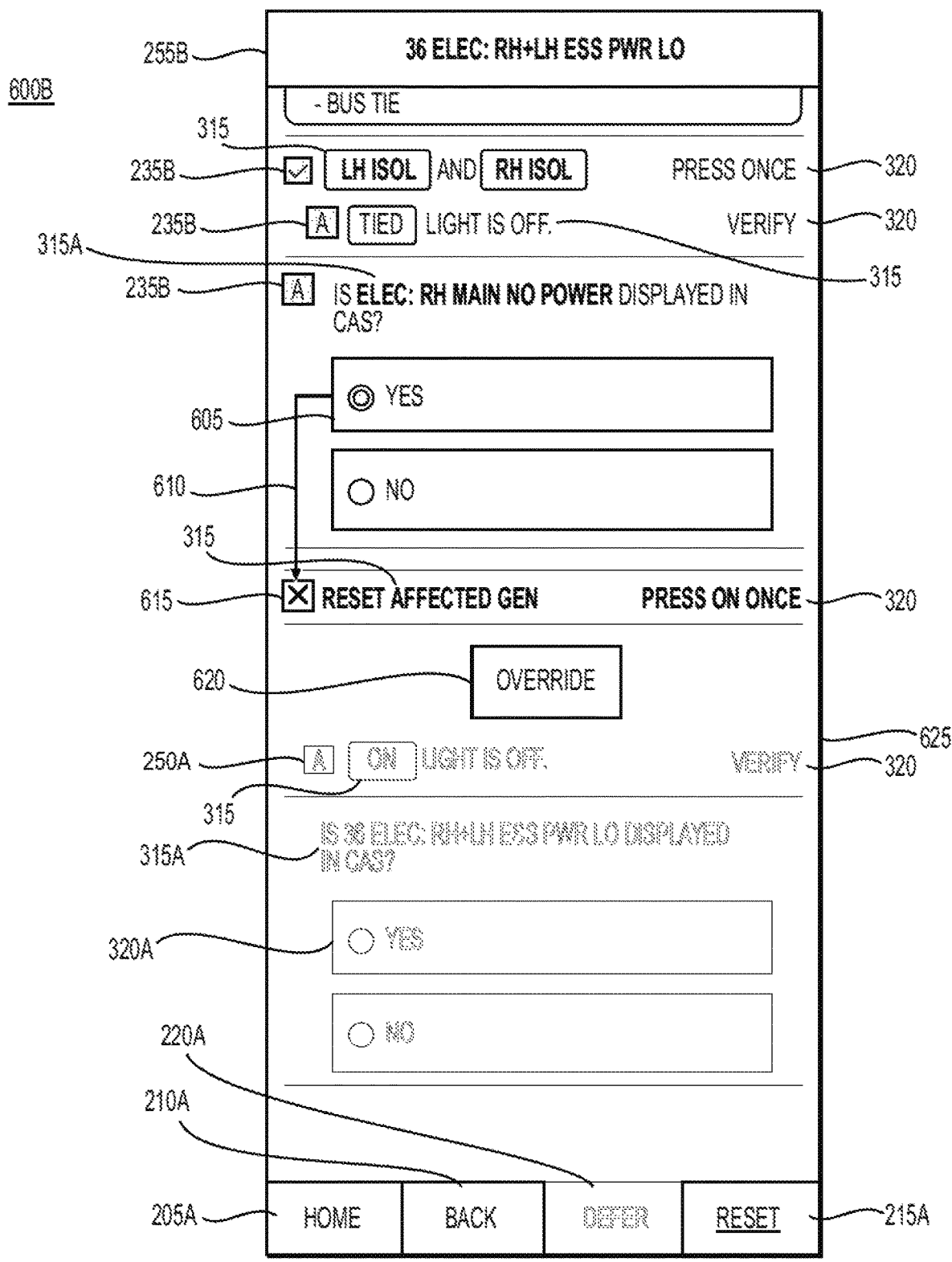
Figure 6C:
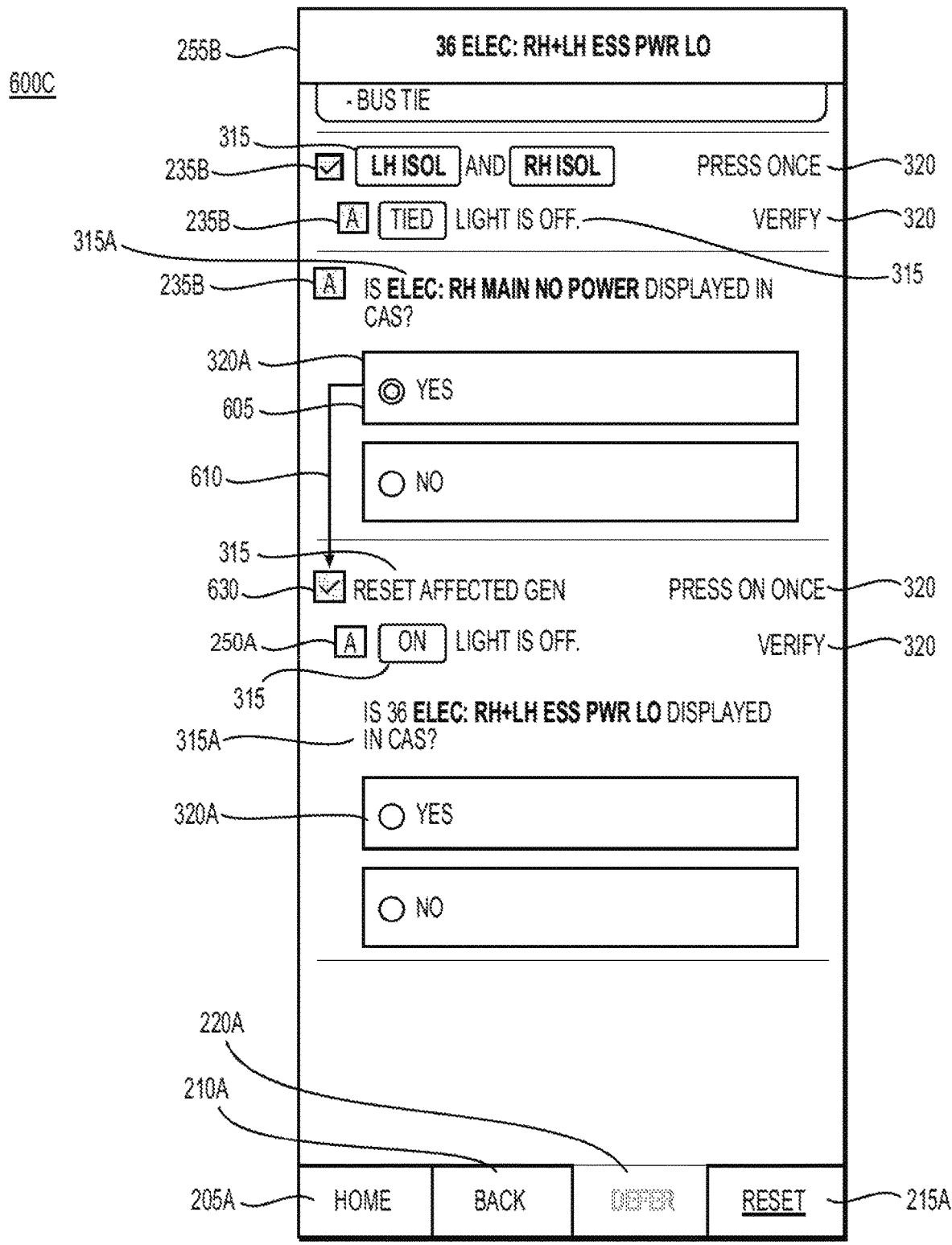

FIGS. 6A-6C depict exemplary GUIs for automatic cross-checking of avionics electronic checklists, according to one or more embodiments. Specifically, FIGS. 6A-6C may depict first normal checklist GUI 600A, a checklist error GUI 600B, and a second normal checklist 600C, respectively, to depict the cross-check process of the checklist system 422.

In the first normal checklist GUI 600A, the first normal checklist GUI 600A may be the same as the GUI 200 or GUI 300, however the first normal checklist GUI 600A may also include a different header 255B, a different group of home icons (including one or more of a second system function menu icon 205A, a second index icon 210A, a second reset icon 215A, and a defer icon 220A), one or more second completed task indicators 235B, one or more second incomplete task indicators 250B, one or more second challenge instructions 315A, and/or one or more second response instructions 320B.

The different header 255B may correspond to a title of a checklist that is currently displayed. The different group of home icons may perform the same functions as the group of home icons discussed above. The one or more second completed task indicators 235B may be the same as the one or more completed task indicators 235. The one or more second incomplete task indicators 250B may be the same as the one or more incomplete task indicators 250. The one or more second challenge instructions 315A may be the same as one or more challenge instructions 315. The one or more second response instructions 320B may be the same as one or more response instructions 320, except the one or more second response instructions 320B may be selectable to input information (e.g., "Yes," "No," "Confirmed," "Verified," etc.), such as in response to content of the one or more second challenge instructions 315A.

The checklist error GUI 600B may depict an error message in response to a user or system input after a user selection on the first normal checklist GUI 600A. The checklist error GUI 600B may be the same as the first normal checklist GUI 600A, however the checklist error GUI 600B may also include a user selection 605, a connection indicator 610, an error message indicator 615, an override button 620, and/or a dimming effect 625.

Specifically, a user may have input a user input indicating a response of "Yes" on one of the one or more second response instructions 320B. The checklist system 422 may update the first normal checklist GUI 600A to display the user selection 605 to reflect the user input indicating the response of "Yes." Additionally or alternatively, the checklist system 422 may determine that the next expected user input and/or system input ("next action") may be related to a "Reset Affected Gen" based on the sequence of completion and/or the required tasks for completion of the checklist. The checklist system 422 may update the first normal checklist GUI 600A with the connection indicator 610 to indicate to the user that the next expected action may be related to a "Reset Affected Gen" by, e.g., connecting the immediately preceding task, action, or reply to the next action.

In the case that the checklist system 422 receives user inputs performing an action associated with the next action or receives system inputs indicating the action was performed, the checklist system 422 may proceed to update the first normal checklist 600C to the second normal checklist 600C. In the case that the checklist system 422 receives user inputs and/or systems inputs not related to the next action (e.g., determine a checklist error), the checklist system 422 may display an error message. The error message may include the error message indicator 615, the override button 620, and/or the dimming effect 625.

To display the error message indicator 615, the checklist system 422 may change the one or more incomplete task indicators 250 and/or the one or more second incomplete task indicators 250B to a different status indicator, such as a box with an X inside the box. The error message indicator 615 may also change the one or more challenge instructions 315, the one or more second challenge instructions 315A, the one or more response instructions 320, and/or the one or more second response instructions 320B by emphasizing the content by, e.g. changing the color of the content, bolding the content, highlighting the content, italicizing the content, etc.

To display the override button 620, the checklist system 422 may display a box below the next action with text "override" inside the box. The override button 620 may be inserted between the next action and content (e.g., task indicators 235/B/250/B, challenge instructions 315/B, and/or response instructions 320/B) nearest the next action, such as below the content.

To display the dimming effect 625, the checklist system 422 may dim a background of not completed tasks or non-required tasks. Additionally or alternatively, when the error message is displayed, the checklist system 422 may prevent the user(s) from proceeding forward in the checklist. For instance, the checklist system 422 may ignore user inputs on the not completed tasks or the non-required tasks in an area associated with the dimming effect 615.

The user(s) may then correct the checklist error by following the checklist task(s) as the checklist task(s) are written and perform the action(s), or the user(s) may select the override button 620 to indicate to the checklist system 422 to accept the completed step as "correct", to thereby resolve checklist errors. The checklist system 422 may receive a user input selecting the override button 620 or a user input to perform the actions (from the mission manager system 424), or a system input indicating the action was performed from the other systems and sensors 434.

The checklist system 422 may, in response receiving the user input selecting the override button 620 or to perform the actions or the system input indicating the action was performed, update the GUI to the second normal checklist 600C. For instance, the checklist system 422 may deemphasize the task associated with the action. For instance, to deemphasize the task, the checklist system 422 may undo the emphasis on the text or symbols associated with the task and/or undo the dimming effect 625 on the background of not completed tasks or non-required tasks. Additionally or alternatively, the checklist system 422 may undo the prevention of the user(s) from proceeding forward in the current checklist. For instance, the checklist system 422 may now process user inputs on the not completed tasks or the non-required tasks. The checklist system 422 may also remove the override button 615 from the checklist error GUI 600B.

Lastly, the checklist system 422 may change the error message indicator 615 to an error resolved indicator 630. The error resolved indicator 630 may be a completed task indicator 235/B.

Figure 7:
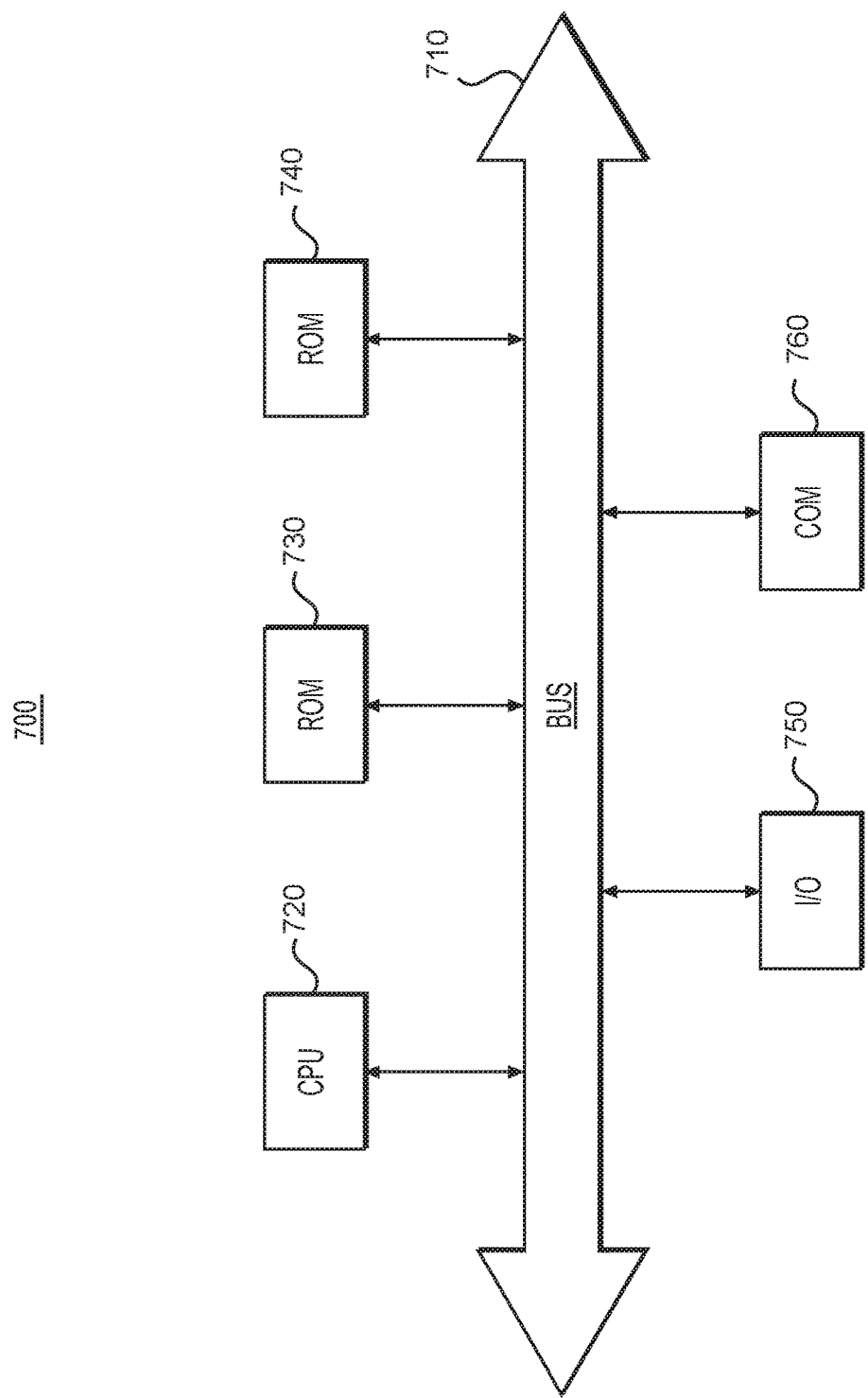
FIG. 7 depicts an example system that may execute techniques presented herein.

FIG. 7 depicts an example system that may execute techniques presented herein. FIG. 7 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform may also include a central processing unit ("CPU") 720, in the form of one or more processors, for executing program instructions. The platform may include an internal communication bus 710, and the platform may also include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. A method for automatic cross-checking of an electronic checklist, comprising:
   receiving a first user and/or system input associated with a graphical user interface (GUI) of the electronic checklist;
   determining whether the first user and/or system input triggers an error;
   in response to determining that the first user and/or system input triggers the error, displaying an error message on a first portion of the GUI and displaying an override button on a second portion of the GUI, wherein the override button is selectable to accept the first user and/or system input as correct;
   receiving a second user and/or system input;
   determining whether the second user and/or system input resolves the error;
   in response to determining the second user and/or system input resolves the error, removing the error message from the GUI; and
   in response to determining the second user and/or system input does not resolve the error, continuing to display the error message on the first portion of the GUI and continuing to display the override button on the second portion of the GUI.

2. The method of claim 1, wherein the determining whether the first user and/or system input triggers the error includes:
   determining whether the electronic checklist is being performed properly based on one or more data structure(s) and/or one or more function(s) from a loadable database and the first user and/or system input.

3. The method of claim 2, wherein the one or more data structure(s) and/or the one or more function(s) from the loadable database include, for the electronic checklist, proper execution information, the proper execution information including information indicating a sequence of completion of the electronic checklist.

4. The method of claim 3, wherein the determining whether the electronic checklist is being performed properly includes:
   determining which task(s) of the electronic checklist have been completed, indicating one or more tasks have been completed;
   comparing the one or more tasks that have been completed to the sequence of completion of the checklist; and
   determining whether the sequence of completion is being followed based on the comparison.

5. The method of claim 4, wherein the determining whether the sequence of completion is being followed based on the comparison includes:
   determining a sequence of completed tasks for the one or more tasks that have been completed based on the one or more tasks that have been completed and associated times of user inputs and/or system inputs for the one or more tasks; and
   determining whether the sequence of completed tasks is different from the sequence of completion of the checklist; and
   in response to determining the sequence of completed tasks is different from the sequence of completion, determine that the error is triggered.

6. The method of claim 1, wherein the error message includes visual indication(s) and/or notification(s) near tasks associated with the error, the visual indication(s) include a change in status indicator for the tasks.

7. The method of claim 6, wherein the displaying the error message on the GUI includes emphasizing the tasks associated with the error by performing one or a combination of:
   bold and/or italicize on text or symbols associated with the tasks associated with the error, and/or
   dimming a background of not completed tasks and/or non-required tasks.

8. A system for automatic cross-checking of an electronic checklist, the system comprising:
   a memory storing instructions; and
   a processor executing the instructions to perform a process including:
      receiving a first user and/or system input associated with a graphical user interface (GUI) of the electronic checklist;
      determining whether the first user and/or system input triggers an error;
      in response to determining that the first user and/or system input triggers the error, displaying an error message on a first portion of the GUI and displaying an override button on a second portion of the GUI, wherein the override button is selectable to accept the first user and/or system input as correct;
      receiving a second user and/or system input;
      determining whether the second user and/or system input resolves the error;
      in response to determining the second user and/or system input resolves the error, removing the error message from the GUI; and
      in response to determining the second user and/or system input does not resolve the error, continuing to display the error message on the first portion of the GUI and continuing to display the override button on the second portion of the GUI.

9. The system of claim 8, wherein the determining whether the first user and/or system input triggers the error includes:
   determining whether the electronic checklist is being performed properly based on one or more data structure(s) and/or one or more function(s) from a loadable database and the first user and/or system input.

10. The system of claim 9, wherein the one or more data structure(s) and/or the one or more function(s) from the loadable database include, for the electronic checklist, proper execution information, the proper execution information including information indicating a sequence of completion of the electronic checklist.

11. The system of claim 10, wherein the determining whether the electronic checklist is being performed properly includes:
   determining which task(s) of the electronic checklist have been completed, indicating one or more tasks have been completed;
   comparing the one or more tasks that have been completed to the sequence of completion; and
   determining whether the sequence of completion is being followed based on the comparison.

12. The system of claim 11, wherein the determining whether the sequence of completion or the required tasks for completion are being followed based on the comparison includes:
   determining a sequence of completed tasks for the one or more tasks that have been completed based on the one or more tasks that have been completed and associated times of user inputs and/or system inputs for the one or more tasks; and determining whether the sequence of completed tasks is different from the sequence of completion; and in response to determining the sequence of completed tasks is different from the sequence of completion, determine that the error is triggered.

13. The system of claim 8, wherein the error message includes visual indication(s) and/or notification(s) near tasks associated with the error, the visual indication(s) include a change in status indicator for the tasks.

14. The system of claim 13, wherein the displaying the error message on the GUI includes emphasizing the tasks associated with the error by performing one or a combination of:

bold and/or italicize on text or symbols associated with the tasks associated with the error, and/or dimming a background of not completed tasks and/or non-required tasks.

15. A non-transitory computer-readable medium storing instructions that, when executed by a processor, cause the processor to perform a method for automatic cross-checking of an electronic checklist, the method comprising:

receiving a first user and/or system input associated with a graphical user interface (GUI) of the electronic checklist;

determining whether the first user and/or system input triggers an error;

in response to determining that the first user and/or system input triggers the error, displaying an error message on a first portion of the GUI and displaying an override button on a second portion of the GUI;

receiving a second user and/or system input;

determining whether the second user and/or system input resolves the error;

in response to determining the second user and/or system input resolves the error, removing the error message from the GUI; and in response to determining the second user and/or system input does not resolve the error, continuing to display the error message on the first portion of the GUI and continuing to display the override button on the second portion of the GUI.

16. The non-transitory computer-readable medium of claim 15, wherein the determining whether the first user and/or system input triggers the error includes:

determining whether the electronic checklist is being performed properly based on one or more data structure(s) and/or one or more function(s) from a loadable database and the first user and/or system input.

17. The non-transitory computer-readable medium of claim 16, wherein the one or more data structure(s) and/or the one or more function(s) from the loadable database include, for the electronic checklist, proper execution information, the proper execution information including information indicating a sequence of completion and required tasks for completion of the electronic checklist, and wherein the determining whether the electronic checklist is being performed properly includes:

determining which task(s) of the electronic checklist have been completed, indicating one or more tasks have been completed;

comparing the one or more tasks that have been completed to the sequence of completion and the required tasks for completion of the checklist; and determining whether the sequence of completion or the required tasks for completion are being followed based on the comparison.

18. The non-transitory computer-readable medium of claim 17, wherein the determining whether the sequence of completion or the required tasks for completion are being followed based on the comparison includes:

determining a sequence of completed tasks for the one or more tasks that have been completed based on the one or more tasks that have been completed and associated times of user inputs and/or system inputs for the one or more tasks; and determining whether the sequence of completed tasks is different from the sequence of completion and the required tasks for completion of the checklist; and in response to determining the sequence of completed tasks is different from the sequence of completion and the required tasks, determine that the error is triggered.

19. The non-transitory computer-readable medium of claim 15, wherein the error message includes visual indication(s) and/or notification(s) near tasks associated with the error, the visual indication(s) include a change in status indicator for the tasks.

20. The non-transitory computer-readable medium of claim 19, wherein the displaying the error message on the GUI includes emphasizing the tasks associated with the error by performing one or a combination of:

bold and/or italicize on text or symbols associated with the tasks associated with the error, and/or dimming a background of not completed tasks and/or non-required tasks.

* * * * *